Nov. 27, 1923.                                                                      1,475,328
                          C. A. WALES
                         VEHICLE FRAME
                        Filed Nov. 9, 1920
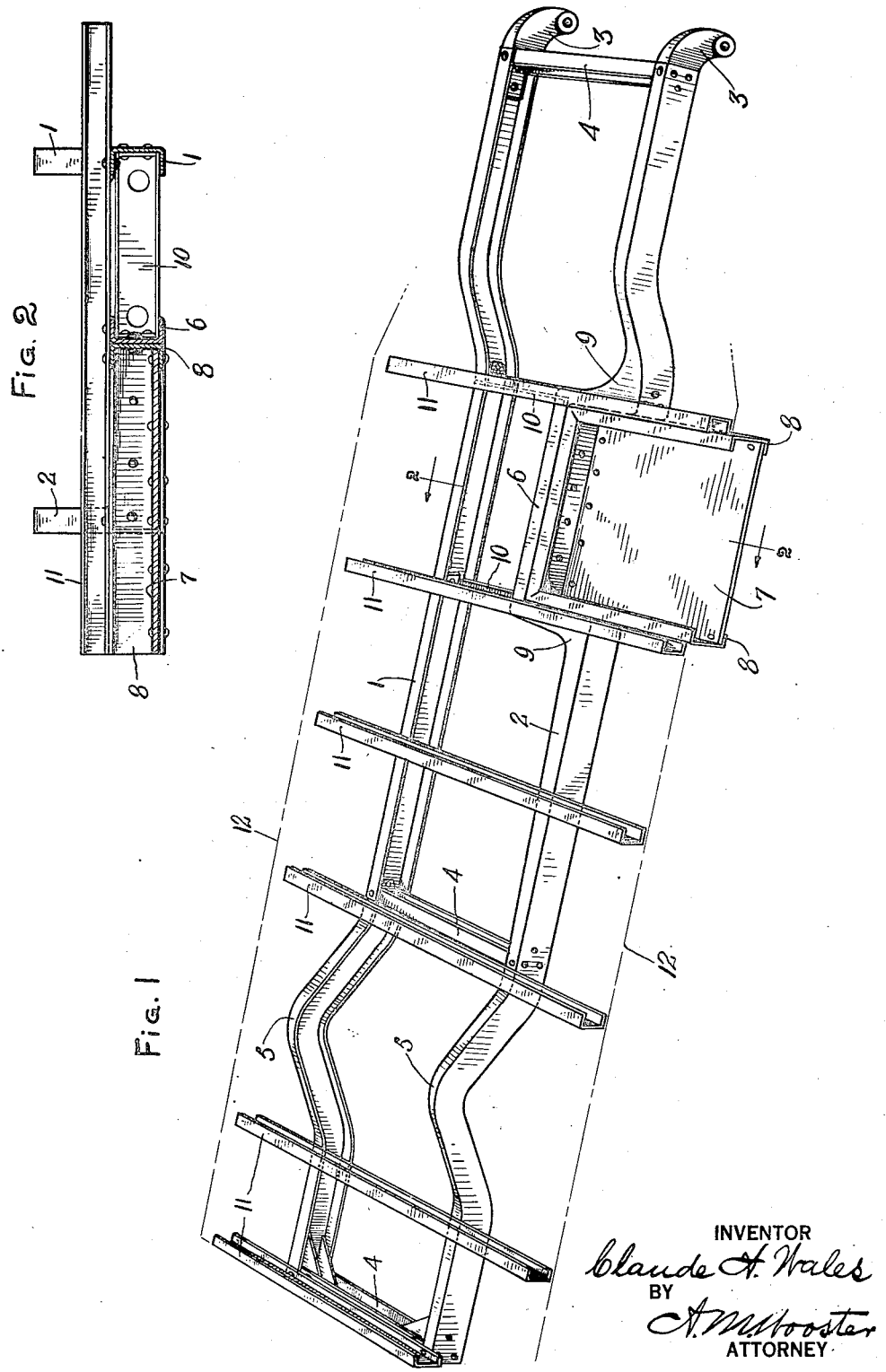
INVENTOR
Claude A. Wales
BY
A. M. Wooster
ATTORNEY Patented Nov. 27, 1923.

1,475,328

UNITED STATES PATENT OFFICE.

CLAUDE A. WALES, OF BROOKLYN, NEW YORK, ASSIGNOR TO THE PASSENGER LORRY COMPANY, A CORPORATION OF DELAWARE.

VEHICLE FRAME.

Application filed November 9, 1920. Serial No. 422,778.

*To all whom it may concern:*

Be it known that I, CLAUDE A. WALES, a citizen of the United States, and resident of Brooklyn, in the county of Kings and State of New York, have invented certain new and useful Improvements in Vehicle Frames, of which the following is a specification.

This invention relates to truck frames, particularly to the frames of lorries or buses for the transportation of passengers and freight, wherein a special construction of frame is desirable in order to enable the passengers to enter and leave without an objectionable number of steps up and down, and also enabling the entrance and exit of the passengers to be under the direct observation and control of the driver. For freight similar conditions apply in order to save time at stops.

In dealing with the problems of safely, quickly and economically handling passengers with buses operated by one man who may have to collect fares, make change, operate doors, and answer questions besides taking on and letting off passengers, watching other traffic, and controlling his motor, speed, and brakes, it is found that unnecessary and expensive delays occur where there are several steps to be negotiated between the ground and the car floor. It is further found that a momentary crowding of passengers within the car on an intermediate loading or entrance platform is unobjectionable, provided that they do not interfere with the controls and doors, where the latter are used. In present practice even with the lowest practicable forms of motor vehicle spring suspensions, intended to lower the frame and body, several steps are necessary between the floor and the ground, as motor vehicle side frames have to be of considerable depth to obtain light weight, and cannot be dropped sufficiently to eliminate a step and still retain the necessary road clearance, unless made shallow and excessively heavy.

I have therefore devised a light motor vehicle frame especially intended for passenger vehicles, which can be hung as low as the necessary clearance permits on any desired form of spring suspension.

The main longitudinal frame members extend the length of the vehicle as in standard practice, but one is deflected at an intermediate portion, as by bending inwardly as herein specifically shown, to provide a pit space and support for the lowered platform. The entrance platform extends from adjacent the outside line of the body inwardly past the front and rear ends of the deflected member to adjacent the center of the frame, and may be depressed as far below the frame as desired, or as is consistent with required road clearance, so as to be a step below the main floor, and an easy step above the ground when in the completed chassis. This platform is preferably opposite the driver's side, as shown, and is of dimensions to hold several standing passengers at once.

In combination with such structure, transverse torque resisting members are provided, so that the frame will not warp or weave.

It will be apparent from a study of the particular embodiment of the invention herein described, that the essential relation between the depressed entrance platform and the frame members may be carried out in various modifications, in accordance with the general design of the vehicle. This invention is characterized by an entrance platform on one side intermediate the ends, extending from the outside line of the body inwardly a substantial distance past the plane passing through the outer edges of the unbent ends of the deflected member, and depressed a step below the main seating floor so as to be within one step of the ground in the completed chassis, so that a passenger will not have to step over the longitudinal member at the usual height above the ground in entering the vehicle. A number of passengers may stand on the platform and pass easily to and from the seating floor one step thereabove.

The invention with reference to a preferred form thereof is shown in the accompanying drawings, wherein—

Figure 1 is an isometric view of a motor vehicle frame embodying the invention, and Figure 2 a detail section on line 2—2 of Figure 1.

The frame is of generally rectangular form according to standard practice, comprising longitudinal channel side members 1, 2, with dropped horns 3 for the front springs, cross members 4, 4, 4, and offsets 5, to lower the frame and clear the rear axle. The members 1, 2, are of channel form as shown of tapering depth from top to bottom, being deepest at the dropped middle portion where the load is heaviest. At this point, these channels may be 12 or more inches deep, as depth gives stiffness and strength with lightness, as compared with a shallower but wider flanged channel. The right side channel 2, or both if desired, is inwardly deflected as by being recessed as at 6, nearly to the center of the frame in the intermediate dropped portion to provide a pit space and receive and carry the lowered intermediate loading platform 7, projecting laterally past the end portions of said longitudinal member 2 to the outside line of the body on one side, the bottom of which platform can be as low as the permissible road clearance plane of the chassis. The frame is usually dropped at the intermediate portion as much as the clearance will permit. If this clearance be taken at 10 inches, which is permissible in city streets, the platform is only one step above the pavement, and on a level or nearly so, with a curb. There is thus but one step between the platform and the street surface, and practically none to the sidewalk at the curb. As herein shown, the recess portions of channel 2 carry a channel 8 which supports the platform 7, which give additional stiffness at the recess, but the platform could be a sheet of metal directly bolted to the bottom of side member 2 at the sides and back of the recess. The channel 2 can be pressed or forged in one piece with gussets 9, or built up of several pieces according to steel frame practice, and preferably gusseted at 9 at top and bottom, to provide stiffness against longitudinal impact. The platform also tends to stiffen the recessed member 2 across the recess. Resistance to torsion, weaving or warping is provided for by special transverse stiffeners or cross bracing members 10 at each end of the inset recess portion 6, between the top and bottom flanges of channels 1, 2. 11 represent stringers for the body, mounted on top of channels 1, 2, and of about the width of the body as shown by line 12.

The motor, transmission, wheels, brakes, and controls will be about according to usual practice, the stiffeners 10 being perforated to allow the driving shaft and controls to pass through, the motor being in front of the platform 7, and the transmission just behind. The length of the platform 7 may all be used as entrance and exit space, which is an advantage over narrow entrances requiring several steps as the tendency is to narrow the entrance steps so as to gain room in the body. I find that several passengers on the platform at once can get on and off and move in and out of the seating space to the rear of the driver and platform without difficulty, and under the observation and control of the driver whose seat will be on the side adjacent and above the platform, where his observation will not be interfered with. A platform capable of comfortably holding six passengers serves very satisfactorily for average traffic conditions. Between the platform and the floor of the body on stringers 11 is an easy step, so that the passengers when once on the platform are safe, and can step up and seat themselves at leisure, or remain standing without interfering with the driver.

Although the invention is especially intended for a passenger truck, the lowered platform will be of advantage for freight trucks in handling mail sacks, and small packages, with or without a helper, as packages can be collected on the platform ready to be put off, incoming mail and packages temporarily loaded on the platform, to be sorted for later delivery after leaving the station.

By this invention it is thus possible to save much idle time at stops owing to the less time required for loading and unloading due to the reduced lift required before the vehicle can start.

The invention is capable of various modifications and changes in the details herein shown without departing from the scope of the appended claims.

I claim:

1. A frame for a motor vehicle comprising a pair of longitudinal members adapted to carry the main floor, cross members connecting and bracing said longitudinal members, one of said longitudinal members being deflected to provide a pit space below the main floor level in the intermediate portion of the frame, a depressed entrance platform carried by said member to constitute a floor for said pit and located within an easy step below the upper surfaces of said longitudinal members, said platform extending substantially inwardly past that plane in which the outside edges of the end portions of said deflected member lie to adjacent the center of the frame.

2. A frame for a motor vehicle having longitudinal side members and cross members, one side member extending inwardly at an intermediate portion toward the center of the frame then longitudinally and then outwardly and continuing the longitudinal line to form an intermediate recess, and a platform carried thereby for closing the bottom of the recess.

3. A frame for a motor vehicle having longitudinal side members and cross members, one side member extending inwardly at an intermediate portion toward the center of the frame then longitudinally and then outwardly and continuing the longitudinal line to form an intermediate recess, and a platform carried thereby for closing the bottom of the recess, the platform extending laterally of the recess outside the frame to approximately the body side line.

4. A frame for a motor vehicle having longitudinal side members, one being interrupted at an intermediate portion to form a recess, transverse stiffening and torque resisting members between said side members the interrupted member extending longitudinally between said transverse members to form the inner side of said recess, and a loading platform below said members forming the bottom of said recess.

5. A frame for a motor vehicle having a pair of longitudinal side members and cross members connecting said side members, and an entrance platform carried by one of said side members outside the space included between the side members, the distance between the side members being less adjacent the platform than elsewhere along the length of the side members to provide substantial depth for the platform in relation to the frame width.

Signed at New York, in the county of New York and State of New York, this 8th day of November, A. D. 1920.

CLAUDE A. WALES.